United States Patent Office 3,233,234
Patented Feb. 1, 1966

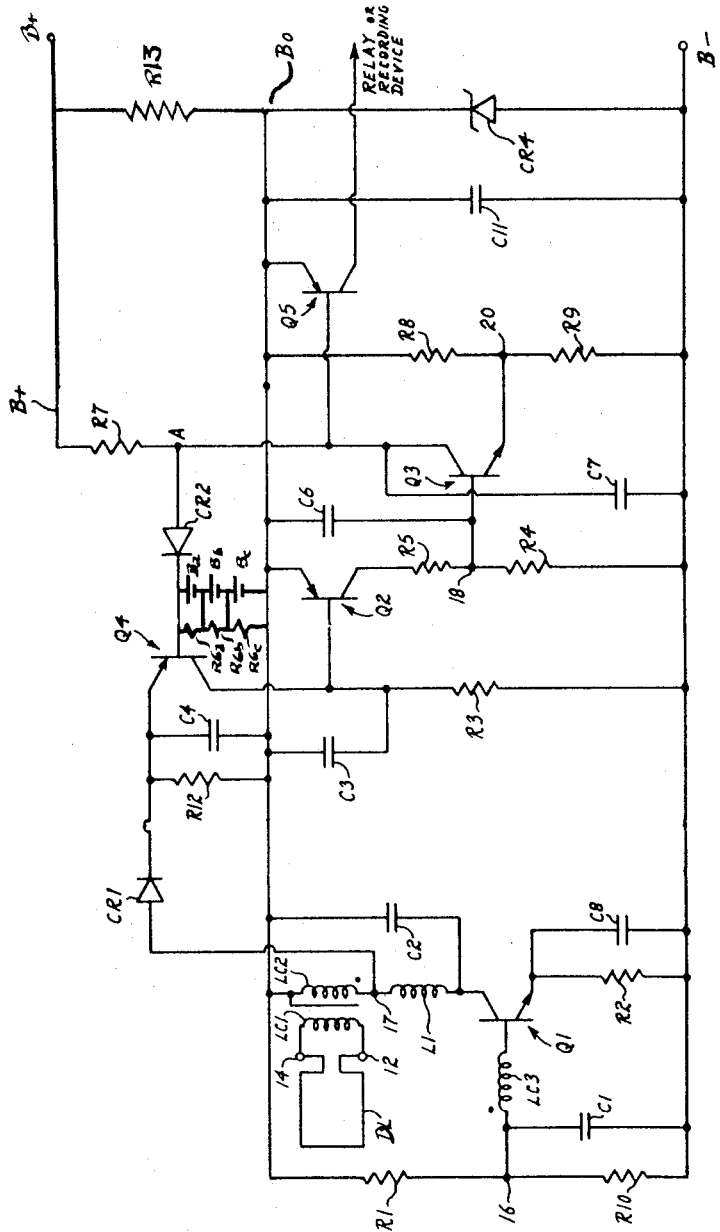

3,233,234
VEHICLE DETECTOR WITH BATTERY
STORAGE ELEMENT
Anthony L. Stelmach, Pierrefonds, Quebec, Canada, assignor to Ferranti-Packard Electric Limited, Toronto, Ontario, Canada
Filed Sept. 4, 1963, Ser. No. 306,512
Claims priority, application Canada, Mar. 9, 1963, 870,520
9 Claims. (Cl. 340—258)

This invention relates to means and a method for electrically detecting the presence or passage or absence of motor vehicles and railway rolling stock.

In this application the term "electronic amplifying device" means a transistor or an electronic tube.

The term "voltage storage device" refers to a variable voltage rechargeable battery or to a plurality of such batteries.

By "recorded" with its corresponding variants of tense and usage in relation to the presence or passage of metal objects, I include the meanings encompassed by the words "detected," "sensed," "counted," "indicated" with their corresponding variants of tense and usage.

The electrical detection of the presence or passage or absence of "vehicles" which term is used hereafter to include: motor vehicles or railway rolling stock; requires the presence of a detecting device, such, for example, as a loop or spaced probes in the vicinity of expected vehicles which it is desired to record. The detection device is thereupon intended to measure a change in one of the electrical quantities associated with the detecting means, such as a change in one or more of resistance, capacitance or inductance due to the presence of a motor vehicle in the electrical environment of the detecting device. In such a detecting device, if the detecting means is a loop or probes in the vicinity of a street or highway, it will be seen that atmospheric or soil changes will tend also to cause changes in the electrical quantity being measured, which could create problems in: adjustment or calibration of, or in detection or counting by, the device.

It is an object of the invention to provide a device and a method of measurement wherein the device is designed to detect a change of the electrical quantity being measured which happens at greater than a predetermined rate; while adjusting itself for changes occurring at less than said predetermined rate.

In this way, atmospheric and soil changes which occur at a relatively slow rate, but tend to change the electrical quality being measured, are compensated for by the circuitry provided, without indicating at the recording means the presence of an automobile; while automobiles driven at predetermined rates of speed and above, are detected since the change in the electrical environment of the detecting device, caused by the automobile, is occurring at a rate higher than the critical rate of change for circuit operation.

It is true that whatever the critical rate of change selected, an automobile may still be moved at a rate of speed to produce a change below the critical rate. While such an automobile will remain undetected, it is felt that the advantages of the system in compensating for changes in the atmosphere or soil environment, and in other respects; more than make up for the disadvantage.

Some of the additional advantages of the circuitry, will be noted. Since the device will compensate for changes in electrical quantities of the detection portion of the circuitry, it will be obvious that the circuitry is equally adapted to compensate for changes in the electrical values of elements in the detector portion of the circuitry. Furthermore, since the circuitry is actuated by rate of change, rather than absolute value, the necessity for initial calibration is avoided. Moreover, since the system is self-compensating, a vehicle may be moved into the detecting vicinity of the detecting means, and be recorded, assuming that it is moved at higher than the predetermined speed. If such a vehicle is then stopped while still in the electrical environment of the detecting means, since the circuitry is self-compensating, it will adjust for the presence of such vehicle as part of the electrical environment and will then be in a state to count a second vehicle passing contemporaneously through the detection area.

There is provided, in accord with the invention, a detector loop; an electronic amplifying device having a first and a second control terminal and at least one output terminal, the electronic amplifying device being biased and connected to supply an output signal responsive to the potential between the first and second control terminals. Associated with the detector loop is circuitry connected and biased to control the potential of the first of said control terminals in accord with the impedance of the detector loop. A circuit is provided, arranged to receive the output signal from the electronic amplifying device and connectable to a recording device, and the circuit is also arranged and designed to provide to a feedback terminal, a feedback signal of a value which, if applied to the second control terminal of the electronic amplifying device, would effectively nullify the effect of the change of potential at the first terminal on the value of the output signal, a rectifier connected between said feedback terminal and the second control terminal, oriented to present an open circuit to changes in the feedback terminal relative to the second control terminal in the same sense as the sense of change at the first input terminal, which it is desired to record. A leakage resistance connects said second control terminal to a D.C. datum of potential, relative to the design range of potentials of the second control terminal, in the same sense as the sense of change in the first control terminal which it is desired to record, and a rechargeable voltage storage device is connected between said second control terminal and a D.C. datum.

The voltage storage device which must be rechargeable to accept increases as well as decreases in potential is a variable voltage rechargeable battery or a plurality thereof and together with the leakage resistance defines a time constant, which determines the time during and rate at which (in the absence of a voltage supply for the second control terminal), the potential of the second control terminal will approach that of the D.C. datum, to which it is connected by the leakage resistance. Since this is the sense of change of potential in which the change at the first control terminal is to be recorded, it will be seen that the time constant is arranged to set the time lag in which the second control terminal will change in the direction of the first to effectively compensate for, in the output signal, the effect of a change at the first control terminal; and thus the design time constant is at least long enough to allow the altered output signal to operate the recording device. When the first control terminal changes in the opposite sense to the one desired to be recorded, the network and the feedback terminal change in the same sense, substantially instantaneously, and as the rectifier is oriented to conduct in the direction from the feedback terminal to the second control terminal during change in this sense, the potential at the feedback terminal is applied to the second control terminal to substantially instantaneously compensate for, in the output signal, the effect of the change at the first control terminal and thus prevents any actuation of the recording device. Moreover the circuit as a whole, after being subjected to a change at the first control terminal in the sense, which it is not desired to record, (which would tend to unbalance the circuit for recording the presence, absence or passage of vehicles) has been substantially instantaneously returned to quiescent condition ready for a further recording. At the same time the potential appearing at the feedback terminal acts to maintain charged the voltage storage device and to maintain the potential at the second control terminal.

When however, a change occurs at the first control terminal which is in the direction desired to be recorded, it is of importance to the circuit the rate in which this happens. Assuming that this happens at a faster rate than the voltage storage device can discharge through the leakage resistance, this change produces a corresponding change at the feedback terminal relative to the second control terminal. However the rectifier will not pass this change to the second control terminal and the supply appearing as potential at the first feedback terminal consequently ceases to maintain the charge on the voltage storage device and the potential of the second control terminal. Thus the voltage storage device begins to discharge through the resistor and the potential of the second control terminal moves at the rate determined by the time constant toward a level which will cause the second control terminal potential to compensate for that of the first control terminal. However the time constant is designed so that, for a predetermined rate of change at the first control terminal, such as by a car being moved at normal or close to normal speeds, the voltage at the second control terminal is maintained sufficiently long, by the charge on the voltage storage device, that a control signal is passed through the network to the recording device. However, if the change of conditions causing the change of potential at the first control terminal in the desired sense, takes place at a rate of speed, close to or slower than the rate of change of the potential at the second control terminal as determined by the time constant, then the two control terminals will move in the same direction effectively together so that no control signal will be produced by the electronic amplifying device for sending to the recording device.

(Here it will be noted that the system is designed to record either the entrance or exit of a vehicle to or from the electrical environment of the loop, as determined by the circuitry, elements and biasing of the system and including the rectifier orientation; and whichever of the entrance or exit is to be recorded, the circuit is designed to substantially instantaneously compensate for, the other of the entrance or exit, to be immediately ready to record the selected entrance or exit of the next vehicle.)

If the detecting loop is placed in a roadway, and heavy rain or melting snow or other occurrence causes a change in the electrical characteristics of the detection loop; then if such change occurs in the non-recording sense, it will be immediately compensated for, while if such change occurs in the recording sense, the rate of change will be sufficiently slow that the device will send no recording signal. It is true that it would be possible to move a motor vehicle into the electrical environment of the loop at a sufficiently slow rate to produce the same effect but this will occur at sufficiently spaced intervals that the error in the count or recording thereby introduced will not, in the usual applications of the device, be material and is outweighed by the other advantages of the loop. Moreover, it will be noted that the critical rate of change delineating recorded from non-recorded changes in the desired sense, will depend on the characteristics of the voltage storage device, discussed hereafter, and the resistance which determines the time constant, and these may be designed for whatever the requirements and thereby lower or raise the speed at which a car may be moved without causing a recording or "count." Thus, to lower the critical rate of speed at which a car will be counted, one or more variable voltage rechargeable batteries may be used and the resistance given a very high value. Moreover, this disadvantage of the system is more than outweighed by its ability to compensate for changes in the electrical environment of the loop. Moreover, any change in the elements of the circuitry connecting the detection loop to the electronic amplifying device, if they occur at a slow rate, will be automatically compensated for by the device just as a change in the electrical environment. It follows from this that gradual deterioration or change in the electronic parts or circuitry may be compensated for and it further follows that the device need not be electrically calibrated initially since it will operate as long as the biasing for the electronic amplifying device and the time constant, remain within a tolerable design range. It will be seen that while the change required at the feedback terminal is a change sufficient to neutralize the effect of a change at the first control terminal on the output signal, and need not be exact, and that the device will, to a large extent, compensate for changes in parameters or deterioration in the parts connecting the output of the electronic amplifying device with the feedback terminal.

A number of advantages have been found to accrue from the choice of one or more variable voltage rechargeable batteries as opposed to a capacitor. With such a battery much greater time constants may be obtained than when a capacitor is used. With such a variable voltage rechargeable battery time constants have been attained which permitted a time lag of 30 seconds between the drop in voltage of the first control terminal and the resultant drop in the second control terminal to a compensating value. This is to be compared with a corresponding time lag of about 5 seconds when a capacitor is used. The use of a battery of the type described instead of a capacitor includes its use at street or highway intersections where although the detector must count automobiles which pass at normal speeds without halting, the detector must also count automobiles which approach the intersection and then halt for an appreciable length of time such as for a left or right hand turn, while waiting for a change in traffic lights.

Although the preceding discussion has centered around the choice of a variable voltage dischargeable battery versus a capacitor, it will be appreciated that the leakage resistance must be correctly selected to provide the desired time constant.

In addition to the advantages where a long time constant is desired, the variable voltage dischargeable battery may also be used in situations where the time constant must be short, merely by the proper selection of a very low resistance.

The drawing illustrates a preferred embodiment of the invention.

In the drawing are shown three D.C. datums indicated as horizontal lines of the drawing mark $B_+$, $B_0$ and $B_-$. It will be realized that one of these may be derived from the others and in the circuit it will be seen that, here, the $B_+$ datum is in actuality derived from the others and it will also be realized that the values need not be $+$, $0$ and $-$ but this indicates their relative potential levels in the preferred embodiment. In the drawing, is shown a detector loop DL having preferably, as shown, a single turn and preferably being arranged horizontally beneath the surface of the road although it may if desired be placed on the road surface. The loop will operate successfully even if not oriented horizontally, since the only critical matter is whether the car to be detected or counted enters the electrical environment of the loop to vary the impedance thereof. The horizontal loop is to be preferred, since all arms of the loop may then be placed in equal and close proximity to the car's path, and the change of impedance caused by the car will then tend to be the maximum for a given loop. The loop connections 12 and 14 are connected through a coil LC1 which is magnetically coupled to a coil LC2. The coil LC2 forms part of the circuitry of an oscillator which utilizes the transistor Q1 wherein the collector of the transistor is connected to $B_0$ through the series coils LC2 and L1 in parallel with the capacitor C2, the reactance of coils and capacitor acting to determine the frequency and output voltage of the oscillator. The $B_0$ line is connected to the $B_-$ line through series resistors R1 and R10 and the point 16 between these resistances is connected to the base of transistor Q1 through a coil LC3 electromagnetically coupled to coils LC1 and LC2. The dots adjacent one end of each of coils LC2 and LC3 provide an indication of the sense of winding of these coils relative to one another to produce the correct polarity for oscillator operation. A capacitor C1 in parallel with resistor R10 provides the base bias for the transistor Q1. The coils L1 and LC2 provide a voltage divider to be tapped for measuring changes of impedance in the loop and the point 17 between these two coils is connected through a rectifier CR1 to the emitter of a PNP transistor Q4, with the rectifier oriented to conduct when the potential at point 17 is higher than at the Q4 emitter.

The emitter of transistor Q1 is connected to $B_-$ through resistor R2 and capacitor C8 in parallel. In some cases it has been found that stability is increased if the resistor R2 is connected to $B_-$ but the capacitor C8 is connected between the emitter and $B_0$, but these are considered mere design variations within the scope of the invention. Resistor R12 and capacitor C4 in parallel connect the Q4 emitter to $B_0$. The collector of transistor Q4 is connected to $B_0$ through capacitor C3 and to $B_-$ through collector resistance R3.

The connections to the base of transistor Q4 will be discussed hereafter although it should be noted that the emitter of transistor Q4 forms the first control terminal and the base of emitter Q4 forms the second control terminal, discussed heretofore, and it will be seen that it is potential differences between the first and second control terminals in one relative sense which are used to actuate the recording means. The collector of transistor Q4 is connected through resistance R3 to $B_-$ and also connected to the base of a PNP transistor Q2 whose emitter is connected to $B_0$ and whose collector is connected through resistances R5 and R4 in series to $B_-$. The two resistors R4 and R5 act as a voltage divider and the point 18 joining them is connected to the base of transistor Q3 the base being connected to $B_0$ by capacitor C6. The emitter of Q3 is connected to point 20 between two resistances R8 and R9 connected in series between $B_0$ and $B_-$ and the Q3 collector is connected through capacitor C7 to $B_-$. The Q3 collector is connected to the base of a transistor switch Q5 of the PNP variety, with the Q5 emitter connected to $B_0$ and the collector connected to a recording device, or relay therefor, not shown. The $B_0$ and $B_-$ datums are connected by capacitor C11 and Zener diode CR4 to shunt any alternating current appearing between the lines and for voltage regulation. The Q5 base is connected to the point A which is the preferred embodiment of what has been called the "feedback terminal." The datum $B_+$ is connected through a resistor R7 to the point A and therefore to the collector of transistor Q3 but point A is also connected through a rectifier CR2 to the base of transistor Q4. The rectifier is oriented to pass current with potentials higher at point A than at the base of Q4. The base of Q4 is connected to the datum $B_0$ by three variable voltage rechargeable batteries $B_a$, $B_b$, $B_c$ in series with the positive poles thereof oriented towards the base of Q4. Three equal leakage resistances $R6_a$, $R6_b$ and $R6_c$ of preferably equivalent value are connected between the base of Q4 and $B_0$. The junction of resistors $R6_a$ and $R6_b$ and the junction of resistors $R6_b$ and $R6_c$ are respectively connected to the junction of $B_a$ and $B_b$ and to the junction of $B_b$ and $B_c$. It will be noted that three variable voltage dischargeable batteries are here used in series, merely to provide a desired potential range. If the desired potential range can be attained with a single variable voltage rechargeable battery then this would be used instead of the three, and a single leakage resistance would then be connected in parallel between the base of Q4 and $B_0$. In the preferred embodiment where three variable voltage rechargeable batteries of equal operating potential are used, the connections between the battery junctions and leakage resistance junctions are provided to place a resistance in parallel with each battery, and the resistances being also equal in value to cause the three batteries to lose potential at the same time, and approximately equally.

Further alternatives in the use of the variable voltage rechargeable battery are available within the scope of the invention including the use of two or more batteries in parallel with each other and with a leakage resistance to $B_0$. As to the choice of batteries to be used and the operating conditions, it will be noted that most batteries are designed so that under normal operation, they will hold a substantially constant potential level during a considerable flow of charge. For the purposes of this invention, a constant potential level prevents the proper operation of the invention, and thus such batteries would be operated at near discharge states where a loss or gain of charge causes a loss or gain of potential. Batteries may of course be provided where the potential varies with the charge over a large proportion of their operating range and the use of such batteries is considered to be within the scope of the invention. In the preferred embodiment each of $B_a$, $B_b$ and $B_c$ is a nickel cadmium cell.

In the preferred embodiment of the invention the $B_+$ and $B_-$ levels are obtained from a power supply (not shown) and the $B_0$ supply is derived from the $B_+$ and $B_-$ levels through resistor R10 connected to $B_+$ and through the various resistances connecting $B_0$ to $B_-$. However, it will be realized that any method of providing two voltage levels (one of which may be ground), and deriving the third therefrom, is considered within the scope of the invention.

The voltage on $B_+$ acts to supply the bias, under quiescent conditions to the base of Q4 through its connection to $B_-$, through resistor R7 to point A, rectifier CR2 and leakage resistance R6. It will be noted that resistor R7 and point A are also connected between $B_+$ and the collector of Q3.

The operation of the circuit will now be discussed.

Suggested or exemplary values are given at the end of this application for the elements shown, but in accord with the scope of the invention, the discussion herein will be in general terms.

The detector loop DL will be located on or under the surface of a road and might, in accord with the invention, be under one lane of such road or might be under a plurality of lanes. It will be noted however that if a single loop underlies two or more lanes, that, the device of the preferred embodiment will only "record" one car if two cars pass simultaneously over the loop. In the quiescent condition, the $B_+$ and $B_-$ sources are connected. The output of oscillator Q1 is tapped between LC2 and L1 and applied through rectifier CR1 as a positive voltage to the emitter of Q4, whose base is held biased by the cumulative charge on batteries $B_a+B_b+B_c$ as maintained by the current normally flowing through R7, CR2 and R6. In the quiescent condition, the collector circuits of Q4, Q2, and Q3 are conducting lightly and thus may vary upwardly or downwardly. Q5 is normally held in cut-off condition. When a car passes over the loop, thus entering its electrical environment, the change in impedance across the loop due to the existence of a car is downward, due to the conductance of the car and the eddy currents created therein, and thus the potential applied to the emitter of Q4, from point 17, decreases. The consequent decrease in collector current from transistor Q4, lower the potential of the base of Q2 and the consequent increase in collector current from the transistor Q2, raises the potential of the base of Q3, and the consequent rise in potential (Q3 being of the NPN type) causes an increase of collector current therein from $B_+$ across resistance R7, lowering the potential of point A. This drop in potential if more than instantaneous, will cause collector current flow in the transistor Q5 (PNP) to actuate a recording device or the relay thereof. The collector current flow in transistor Q3, causing a potential drop in point A, because of the flow from $B_+$ through R7; and this drop if it could pass CR2, would cause the lowering of the base potential at transistor Q4 which is adjusted to compensate for the drop in Q4 emitter potential, which would stop the increased collector current at Q4 immediately after its commencement and thus prevent the sustenance of the potential drop at point A and prevent operation of the recorder through Q5. However the potential at point A drops to a value lower than the Q4 base potential and thus the rectifier CR2 acts as substantially an open circuit to prevent the lowering of the Q4 base potential. Since there is no longer a connection to supply potential from $B_+$ to the base of Q4, the batteries $B_a-B_b-B_c$ begin to discharge through the leakage resistances R6 and thus the Q4 base potential starts to fall in potential toward the $B_-$ potential and will continue to fall until the Q4 base potential reaches that of feedback terminal A.

If the drop in potential at the Q4 emitter and point A (which are substantially simultaneous), caused by the car, occurs at a rate faster than the drop in potential at base Q4 can follow (controlled by the time constant) then the decreasing difference between Q4 emitter and Q4 base may reach a stage sufficient to operate the relay through Q5. If the drop in potential at the Q4 emitter and point A caused by the car occurs at a rate sufficiently slow, the Q4 emitter and Q4 base remain, due to circuit design, sufficiently close to their relative quiescent potential, and the relay through Q5 will not operate.

When a car leaves the electrical environment of the loop, the voltage at the emitter of Q4 will rise, causing a consequent rise in the potential of the base of Q2 and consequent drop in the potential of the base of Q3 causing a drop in Q3 collector current through R7, causing the point A to rise in potential above the then potential of Q4 base. Since rectifier CR2 is oriented to pass positive potential to the base of transistor Q4, the rising potential of point A will carry the Q4 base potential with it and at the same time charge C5 to the same potential. Thus, this rise in potential of the emitter (i.e. first control) terminal of Q4, is immediately compensated for, by the rise in potential of the Q4 base (i.e. second control terminal) now governed by point A and thus the state of Q5 is maintained in its quiescent condition, i.e. non-conducting.

If a rise in potential at Q4 emitter is caused by other factors such as the ground drying, or by an increase in impedance due to a deterioration of an electrical part, then compensation of the second control terminal to the first will immediately occur just as if the increase in potential were caused by a car leaving the vicinity of the loop. Moreover the constants of the feedback circuit are adjusted so that the changes at point A are of a magnitude within the design operation of Q5 and the relay or recording device to compensate for the change at the first control terminal.

Thus it will be seen that the result of a potential drop at Q4 emitter may create a condition at Q5 which is sustained long enough to operate a relay while a rise in voltage at Q4 will be immediately compensated for through the circuitry. Such immediate compensation has the practical result that a car leaving the environment of the loop immediately readies the loop to detect the subsequent car. In fact, with a car leaving the electrical environment of the loop, but still affecting its impedance, the system can still record or "count" a car entering the loop. It will also be noted that a car parked in the loop will, whether or not it has operated the recording device, alter the quiescent electrical environment of the loop, that is the point A, which will, after the car is parked, compensate at Q4 base for the new Q4 emitter potential. If while the car is still parked in the loop, a second car crosses the loop, the quiescent environment which now takes into account the parked car will allow the system to record the second car.

The circuit has been discussed in relation to the passage of a car but it will be obvious that the loop could be placed and used in the vicinity of a railroad to count, sense or record railroad cars. On the other hand, the device may also operate as a "presence" detector and indicate the presence of a vehicle rather than its passage. In this case, it will not be desired that the circuit return quickly to a quiescent condition at relevant times due to the presence of a metal object in the environment of the loop. Therefore the time constant of the voltage storage device and leakage resistor must be relatively long and the variable voltage rechargeable battery must be adapted to assume the necessary potential as called for by the feedback point A and the resistor or resistors R6 might be increased to a much larger value. With such a device, the loop might be placed beneath a parking spot in a parking lot with the sensing means adapted over a predetermined period of time to indicate the presence of a car thereon. It is true that with the escape of the charge from the battery, the circuit would eventually reach quiescent conditions, but an indication would be available for the design period.

It will also be obvious that the system may be designed to record the exit or absence of a vehicle from the loop vicinity, instead of its entrance or presence.

It will be noted that the criteria of operation of the device in general are discussed in the introduction and defined in the claims herein. Except where limited by the claims, applicant considers changes of polarity or bias, substitution of tubes for transistors, or PNP for NPN transistors or vice versa, or generally the substitution of equivalently operating elements or circuits; for those shown in the specific embodiment, to be within the scope of the invention.

*Schedule*

| | Ohms |
|---|---|
| R1 | 10,000 |
| R2 | 100 |
| R3 | 33,000 |
| R4 | 22,000 |
| R5 | 2,700 |
| R7 | 10,000 |
| R8 | 2,700 |
| R9 | 2,700 |
| R10 | 4,700 |
| R12 | 10,000 |
| Q1, Q3 | 2N1808 |
| Q2 | 2N404 |
| Q5 | 2N404A |
| Q4 | 2S303 |
| C1 | 0.01 $\mu$ |
| C2 | 0.022 $\mu$ |
| C3 | 0.01 $\mu$ |
| C4 | 50. $\mu$ |
| C6 | 0.01 $\mu$ |
| C7 | 10. $\mu$ |
| C8 | 0.1 $\mu$ |
| C10 | 0.01 $\mu$ |
| C11 | 50. $\mu$ |
| L1 | 15. $\mu$ |
| CR1, CR2 | 1N126A |
| CR4 | 1N2976 |

I claim:
1. A vehicle detector comprising:
   an electronic amplifying device having first and second control terminals and an output terminal; for supplying an output signal in response to the relative potential between said first and second control terminals;
   a detector loop;

circuitry connected to said loop and said first input terminal for varying the potential of said first terminal in response to a change in the impedance of said loop;

a circuit connected to receive said output signal and connectable to operate a recording device in accord with a change in one sense, of said output signal;

a feedback terminal connected to said last mentioned circuit, said circuit for producing at the feedback terminal, a feedback signal of a value which, if applied to a second control terminal of said electronic amplifying device, would compensate for the change at the first input terminal sufficiently to prevent substantive variation of said output signal;

a connection from said feedback terminal through a rectifier to said second feedback terminal; the orientation of the said rectifier being such that it presents a substantially open circuit to potentials at the feedback terminal in the sense of the change of the first control terminal relative to the second control terminal, which it is desired to record;

at least one variable voltage rechargeable battery connecting said second control terminal to a direct current datum, a leakage resistance connecting said second control terminal to a direct current datum of a potential in the same sense relative to the potential of said second control terminal as the sense of the change of the first control terminal which it is desired to record.

2. A vehicle detector comprising:

an electronic amplifying device having first and second control terminals and an output terminal; for supplying an output signal at said output terminal in response to the relative potential between such first and second control terminals;

a detector loop;

circuitry connected to said loop and said first input terminal for varying the potential of said first terminal in response to a change in the impedance of said loop;

a circuit connected to receive said output signal, for operating a recording device in accord with a change in one sense of said output signal, and to provide to a feedback terminal, a feedback signal of a value which, if applied to the second control terminal of said electronic power amplifying device, would nullify the effect of said change of potential at said first input terminal, on the value of said output signal;

a connection from said feedback terminal through a rectifier, to said second control terminal, said rectifier being oriented to pass current when said feedback terminal is at a potential relative to said second control terminal in the sense opposite to the change in potential in said first control terminal which it is desired to record;

at least one variable voltage rechargeable battery connecting said second control terminal to a direct current datum;

a leakage resistance connecting said second control terminal to a direct current datum of a potential in the same sense relative to the potential of said second control terminal as the sense of the change of the first control terminal which it is desired to record.

3. For an automobile detecting device:

an electronic amplifying device having at least one output terminal and a first and a second control terminal for providing at said output terminal an output signal, determined by the potential difference between said first and second control terminals;

detection means and circuitry connected to said first control terminal for varying the relative difference in potential between said first and second control terminals, in one sense, when a car approaches said detection means and in the opposite sense when a car recedes from said detection means;

feedback circuitry connected between said output terminal and a feedback terminal responsive to said output signal, for causing potentials at said feedback terminal which if applied to said second control terminal would cause it to vary in the same sense as said first control terminal;

a rectifier connecting said feedback terminal and said second control terminal, oriented to pass current when said feedback terminal potential is higher than that of said second control terminal;

at least one variable voltage rechargeable battery connecting said second control terminal to a direct current datum;

a leakage resistance connecting said second control terminal to a direct current datum of a potential lower than the design range of potentials of said second control terminal;

a terminal connected to be controlled by the amount of said output signal, for connection to a recording device.

4. A device as claimed in claim 1 wherein at least two variable voltage rechargeable batteries are connected in series between said second control terminal and such direct current datum, and wherein said leakage resistance comprises a resistance for each of said batteries and connected in parallel therewith.

5. A device as claimed in claim 4 wherein the resistances making up said leakage resistance are of substantially equal value and the said batteries are of substantially equal operating potential.

6. A device as claimed in claim 2 wherein at least two variable voltage rechargeable batteries are connected in series between said second control terminal and such direct current datum, and wherein said leakage resistance comprises a resistance for each of said batteries and connected in parallel therewith.

7. A device as claimed in claim 6 wherein the resistances making up said leakage resistance are of substantially equal value and the said batteries are of substantially equal operating potential.

8. A device as claimed in claim 3 wherein at least two variable voltage rechargeable batteries are connected in series between said second control terminal and such direct current datum, and wherein said leakage resistance comprises a resistance for each of said batteries and connected in parallel therewith.

9. A device as claimed in claim 8 wherein the resistances making up said leakage resistance are of substantially equal value and the said batteries are of substantially equal operating potential.

References Cited by the Examiner

UNITED STATES PATENTS

| | | | |
|---|---|---|---|
| 2,620,383 | 12/1952 | Glinski | 324—41 X |
| 2,708,746 | 5/1955 | Shaw | 340—258 X |
| 2,807,720 | 9/1957 | Charles | 324—41 |
| 2,917,732 | 12/1959 | Chase | 340—258 |
| 2,919,413 | 12/1959 | Charles | 324—41 X |
| 2,943,306 | 6/1960 | Gray | 340—258 |

FOREIGN PATENTS

| | | |
|---|---|---|
| 704,476 | 2/1954 | England. |
| 254,969 | 1/1959 | Switzerland. |

NEIL C. READ, *Primary Examiner.*

R. M. GOLDMAN, *Assistant Examiner.*